United States Patent [19]
Ishii

[11] Patent Number: 4,873,603
[45] Date of Patent: Oct. 10, 1989

[54] CIRCUIT BREAKER

[75] Inventor: Kazuhiro Ishii, Fukuyama, Japan

[73] Assignee: Mitsubishi Denki Kabushiki Kaisha, Tokyo, Japan

[21] Appl. No.: 314,160

[22] Filed: Feb. 23, 1989

[30] Foreign Application Priority Data

Feb. 24, 1988 [JP] Japan .................................. 63-41054

[51] Int. Cl.⁴ ........................................... H02H 3/093
[52] U.S. Cl. ...................................... 361/96; 361/92; 361/94; 340/662; 324/424
[58] Field of Search ....................... 361/90, 92, 94–97; 340/661–663; 324/424

[56] References Cited

U.S. PATENT DOCUMENTS

| | | | |
|---|---|---|---|
| 3,924,160 | 12/1975 | Maier et al. | 317/36 |
| 4,414,601 | 11/1983 | Conroy, Jr. | 361/96 X |
| 4,694,374 | 9/1987 | Verbanets, Jr. | 361/96 |
| 4,710,845 | 12/1987 | Demeyer | 361/96 |

Primary Examiner—Todd E. Deboer
Attorney, Agent, or Firm—Burns, Doane, Swecker & Mathis

[57] ABSTRACT

Output current of secondary winding of a current transformer (21) corresponding to current value of an A.C. power line (1) is led to series connection of an electric power circuit (500) and resistors (40,41); voltages obtained across the resistors (40,41) are input to a time delay circuit (70) which ignites a load break contact (200) in the A.C. power line (1) when an accident overcurrent flows in compliance with tripping characteristics. A quasi output signal or reference signal for testing of D.C. voltage is applied to the time delay circuit (70) when any current does not flow in the A.C. power line, thereby to enable tripping test of the circuit breaker as it is connected to the actual power line.

1 Claim, 6 Drawing Sheets

CIRCUIT BREAKER

FIELD OF THE INVENTION AND RELATED ART STATEMENT

1. Field of the Invention

The present invention relates to a circuit breaker having overcurrent tripping apparatus, and especially relates to an improvement of checking apparatus of tripping characteristic of the circuit breaker

2. Description of the Related Art

In a conventional circuit breaker, for example, shown in Published Unexamined Japanese Patent Application Sho 60-32211, output currents of secondary windings of current transformers, as current detection means, flow in rectifying circuits. A part of D.C. voltage from the rectifying circuit is applied to an electric power circuit of a signal processing circuit such as a microcomputer and the remainder of the D.C. voltage than the rectifying circuit is applied to a shunt circuit, whose output is for being used as control signals of the signal processing circuit.

When a part of the secondary output currents of the current transformers for detecting current values of A.C. power lines flow to the electric power circuit, value of the current flowing the shunt circuit does not correspond to the current flowing on the A.C. power lines. As a result, errors are contained among level detection of the accident overcurrent. Furthermore, the value of the current flowing in the shunt circuit is not kept constant, and therefore it is difficult to compensate the error of the level detection of the accident overcurrent.

Still more, the conventional circuit breaker does not have checking function of the tripping characteristic. Therefore, it is very difficult and dangerous to check the tripping characteristic of the circuit breaker even when the checking is executed for an actually used circuit breaker.

OBJECT AND SUMMARY OF THE INVENTION

Object of the present invention is to provide an improved circuit breaker wherein accuracy of the level detection of the accident overcurrent is improved and the tripping characteristic is safely and easily checkable for the circuit breaker actually under use.

The circuit breaker in accordance with the present invention comprises:

at least one current transformer for detecting current flowing on at least one A.C. power line;

at least one rectifying circuit for converting A.C. output of secondary winding of the current transformer to unidirectional current;

a series connection of an electric power circuit and at least one resistor connected between output terminals of the rectifying circuit, the resistor being for converting current flowing thereon to a voltage;

at least one differential amplifier for amplifying the voltage across both ends of the resistor;

at least one D.C. power source for outputting quasi input voltage;

at least one switch connected between the D.C. power source and the differential amplifier;

at least one test signal generating circuit for generating an output for controlling the switch turning on and off, to apply the quasi input voltage to the differential amplifier when the switch is turned on;

at least one connector having plural contacts for supplying D.C. voltage from external power source to the electric power circuit and the test signal generating circuit; and a reverse current preventing device connected between the electric power circuit and the contacts to of the connector. to the electric power circuit.

The circuit breaker in accordance with the present invention is constituted as mentioned above. Therefore, A.C. output of the secondary winding of the current transformer which is in proportion to the current value flowing on the A.C. power line is converted to a unidirectional current by the rectifying circuit. And the whole unidirectional current is led to the electric power circuit and the resistor for detecting the current value. Namely, the whole secondary output current of the current transformer flows on the resistor, so that there is no error is produced in detected result on the overcurrent. As a result, accuracy of level detection of an accident overcurrent is improved.

Furthermore, the circuit breaker has the test signal generating circuit, thereby application of the quasi input voltage made from the D.C. power source to the differential amplifier is made by switching on and off. As a result, checking of tripping characteristics of the circuit breaker is easily made on the circuit breaker which is actually connected in the power line and in use now.

Still more, the circuit breaker in accordance with the present invention has the reverse current preventing device connected between the electric power circuit and the contacts. Therefore, even when all the contacts are short-circuited under condition that the A.C. power line is active, the secondary current from the current transformer may not be supplied to the contacts. As a result, desired overcurrent tripping is achieved.

DESCRIPTION OF THE PREFERRED EMBODIMENTS

A preferred embodiment of a circuit breaker in accordance with the present invention is described referring to FIG. 1, FIG. 2, FIG. 3, FIG. 4, FIG. 5 and FIG. 6.

Figure 1:
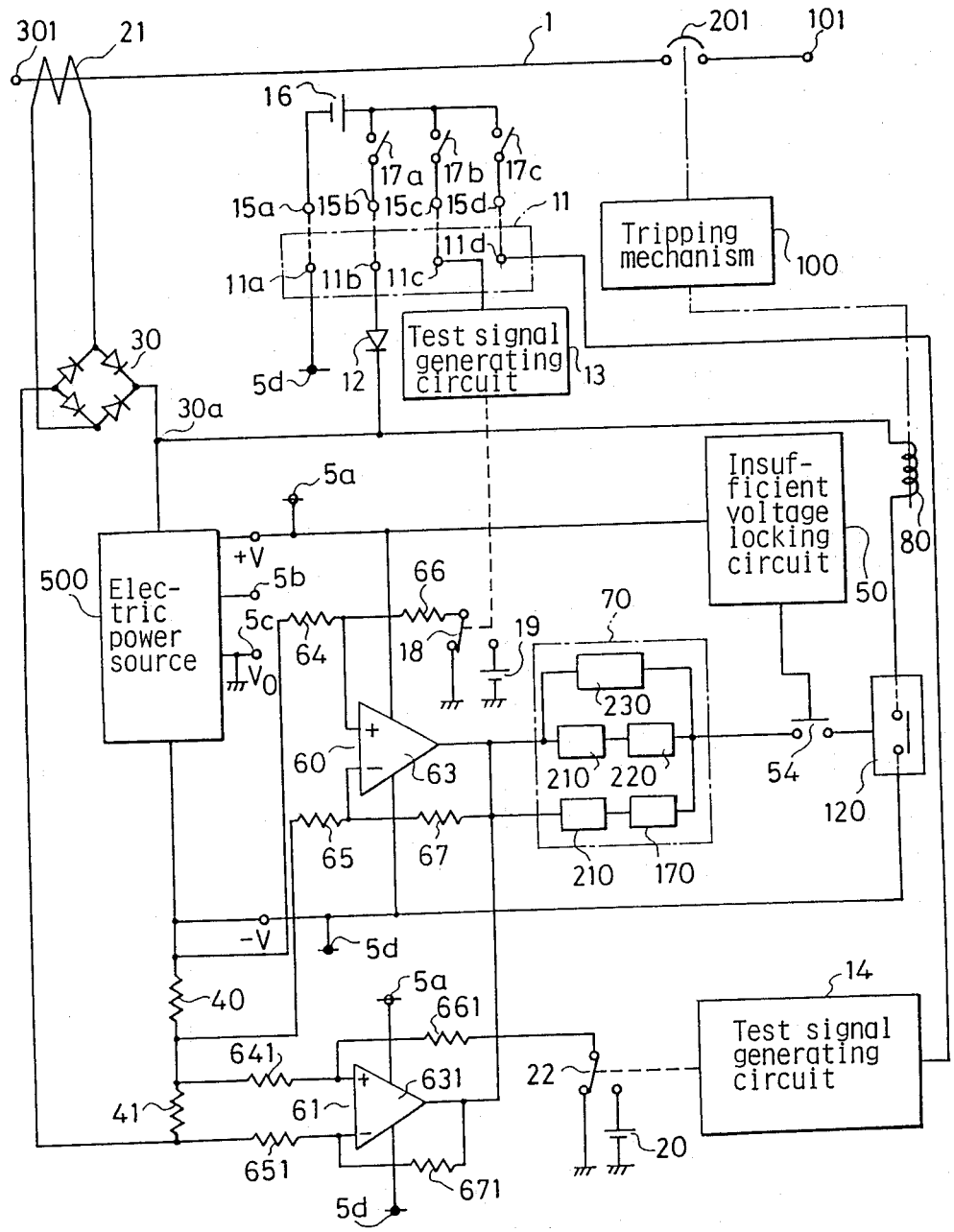
FIG. 1 is a circuit diagram showing a preferred embodiment of a circuit breaker in accordance with the present invention.

FIG. 1 is a circuit diagram showing a circuit breaker in accordance with the present invention. In this embodiment, only a single phase of the power line and a circuit breaker of a single phase are shown for making the description simple, but the actual system has three power lines and three circuit breakers of the same constitution.

In FIG. 1, a terminal on electric power side 101 is to be connected to an A.C. electric power source (not shown) and a load break contact 201 is connected to the terminal on the electric power side 101. The A.C. power line 1 is connected between the load break contact 201 and a terminal on load side 301. A current transformer 21 is provided on the A.C. power line 1 between the terminal on electric power side 101 and the terminal on the load side 301. A rectifying circuit 30 is connected to secondary output terminals of the current transformer 21 for changing an alternating current flowing on secondary winding of the current transformer 21 to a unidirectional current. The rectifying circuit 30 consists of two sets of series circuits of diodes. An electric power circuit 500 for outputting a D.C. constant voltage is connected to a positive output terminal of the rectifying circuit 30. The electric power circuit 500 has a positive terminal $5a$, a reference output terminal $5b$, a middle output terminal $5c$ and a negative output terminal $5d$.

Figure 2:
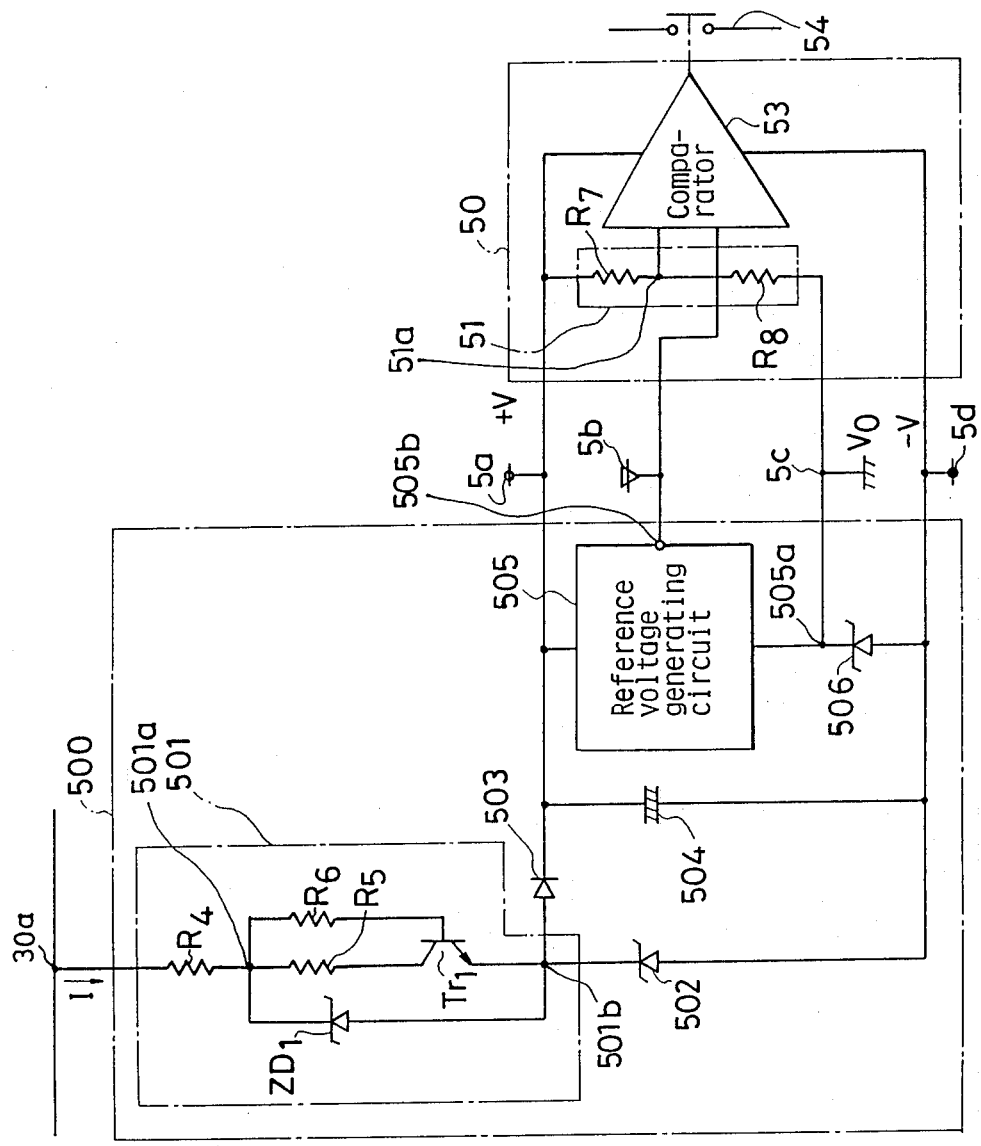
FIG. 2 is a circuit diagram showing details of an electric power circuit and an insufficient voltage locking circuit in the circuit breaker in accordance with the present invention.

FIG. 2 shows a preferred embodiment of the electric power circuit 500 shown in FIG. 1. In FIG. 2, an impedance circuit 501, which makes tripping operation of an electromagnetic tripping apparatus easy, comprises: a series connection of resistors $R_4$ and $R_5$ connected between an output terminal $30a$ of the rectifying circuit 30 and the collector of a transistor $Tr_1$; a resistor $R_6$ connected between the connection point $501a$ of the resistors $R_4$ and $R_5$ and the base of the transistor $Tr_1$; and a zener diode $ZD_1$ connected between the connection point $501a$ of the resistors $R_4$ and $R_5$ and the emitter of the transistor $Tr_1$.

A voltage restriction device 502 such as a zener diode is connected to the impedance circuit 501 as series connection. The anode of a diode 503 is connected to the connection point $501b$ of the impedance circuit and the voltage restriction device 502. A smoothing capacitor 504 is connected between the cathode of the diode 503 and the negative terminal $5d$ of the electric power circuit 500. The cathode of the diode 503 is further connected to the positive terminal $5a$ of the electric power circuit 500.

A reference voltage generating circuit 505 is connected to the positive terminal $5a$ of the electric power circuit 500. Another voltage restriction device 506 such as a zener diode is connected in series to the reference voltage generating circuit 505. The connection point $505a$ of the reference voltage generating circuit $505a$ and the voltage restriction device 506 is connected to the middle terminal $5c$ of the electric power circuit 500. Furthermore, an output terminal $505b$ of the reference voltage generating circuit 500 is connected to a reference terminal $5b$ of the electric power circuit 500.

In FIG. 1, the negative terminal $5d$ of the electric power circuit 500 is connected to a terminal of a resistor 40 for current detection. The other terminal of the resistor 40 is connected to a terminal of another resistor 41 for current detection. The other terminal of the resistor 41 is connected to the negative terminal of the rectifying circuit 30.

Differential amplifiers 60, 61 respectively consist of an operational amplifier 63 or 631 and four resistors 64, 65, 66 and 67 or 641, 651, 661 and 671. Electric power is supplied to the differential amplifier 60 and 61 from the electric power circuit 500. Input terminals of the differential amplifiers 60 and 61 are respectively connected to both terminals of the resistors 40 and 41. The differential amplifiers 60 and 61, convert voltage drop of the resistors 40 and 41 for current detection respectively to a voltage signal based on a middle voltage Vo of the electric power source 500. The relation of gains of the differential amplifiers 60 and 61 are selected such that the gain of the one nearer to the electric power circuit 500 is smaller than that of the other. In this embodiment, the relation is concluded that the gain of the differential amplifier 60 is smaller than that of the differential amplifier 61.

A time delay circuit 70 comprises an instant time tripping circuit 230, a short time tripping circuit 220 and a long time tripping circuit 170. Respective output terminals of the instant time tripping circuit 230, the short time tripping circuit 220 and the long time tripping circuit 170 are connected commonly to an output terminal $70a$ of the time delay circuit 70.

Namely, the instant time tripping circuit 230 is connected to the output terminal of the differential amplifier 60. And a series connection of a peak value conversion circuit 210 and the short time tripping circuit 220 and another series connection of an effective value conversion circuit 211 and the long time tripping circuit 170 are connected to the instant time tripping circuit 230 as parallel connection. The instant time tripping circuit 230 outputs a trip signal at the time when the input signal thereto becoms above a first predetermined value. The short time tripping circuit 220 outputs a trip signal shortly after that the input of peak value from the peak value conversion circuit 210 becoms above a second predetermined value. And the long time tripping circuit 170 outputs a trip signal after a predetermined long time period from that the input of effective value from the effective value conversion circuit 211 becoms above a third predetermined value.

An electromagnetic tripping coil 80 is connected to a positive terminal of the amplifying circuit 30. A switching circuit 120 is connected between the electromagnetic tripping coil 80 and the negative terminal $5d$ of the electric power circuit 500. The electromagnetic tripping coil 80 is mechanically linked to the tripping mechanism 100 for opening a load break contact 201 provided on the A.C. power line 1 and is excited for driving the tripping mechanism 100 when the switching circuit 120 turns on.

An insufficient voltage operation locking circuit 50 for locking the tripping operation when the voltage of the electric power circuit 500 is insufficient (is below a predetermined voltage), has an output switch 54 which is connected between the switching circuit 120 and the time delay circuit 70. The insufficient voltage operation locking circuit 50 comprises a comparator 53 and a potential divider 51 as shown in FIG. 2. The potential divider 51 consists of the series connection of resistors $R_7$ and $R_8$ connected between the positive terminal $5a$ and the middle terminal $5c$ of the electric power circuit 500. The connection point $51a$ of the resistors $R_7$ and $R_8$ is connected to one input terminal of the comparator 53 and the other input terminal of the comparator 53 is connected to the reference terminal $5b$ of the electric power circuit 500.

In FIG. 1, a connector 11 for testing operation has contacts $11a$, $11b$, $11c$ and $11d$. The contact $11a$ is connected to the negative terminal $5d$ of the electric power circuit 500. The contact $11b$ is connected to the anode of a diode 12 which is used for preventing reverse current to the contacts and the cathode of the diode 12 is connected to the positive terminal 30a of the rectifying circuit 30. The contact 11c is connected to a first test signal generating circuit 13 and the contact 11d is connected to a second test signal generating circuit 14.

Terminals 15a, 15b, 15c and 15d are disconnectably connected to the contacts 11a, 11b, 11c, and 11d respectively. The terminal 15a is connected to the negative electrode of a D.C. power source 16. Other terminals 15b, 15c and 15d are respectively connected to switches 17a, 17b and 17c. And the switches 17a, 17b and 17c are connected to the positive electrode of the D.C. power source 16.

Operation of the above-mentioned circuit is described in the following.

When a current flows on the A.C. power line 1 of FIG. 1, a secondary alternating electric current having a value defined by the ratio of current transformation flows on a secondary winding of the current transformer 21. The secondary alternating electric current is converted to a unidirectional electric current by the rectifying current 30. The output current of the rectifying circuit 30 flows through the electric power circuit 500 and the resistors 40 and 41. And the output current circulates to the rectifying circuit 30. At this time, a current having waveforms of full wave rectification corresponding to the current flowing on the A.C. power line 1 flows on the electric power circuit 500 and the resistors 40 and 41.

Figure 3:
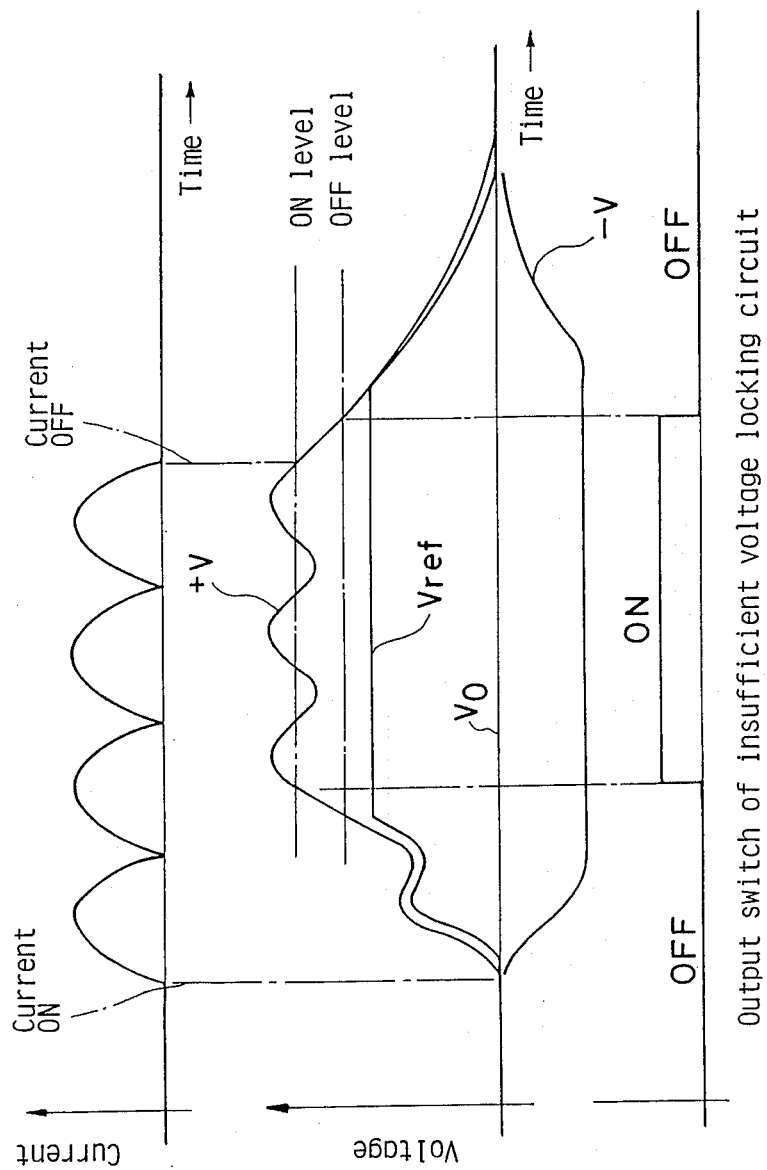
FIG. 3 is a time chart showing operations of the electric power circuit and the insufficient voltage locking circuit of the circuit breaker in accordance with the present invention.

When the current having waveforms of full wave rectification flows in the electric power circuit 500, voltage +V, Vref, Vo and −V are generated on the terminals 5a, 5b, 5c and 5d as shown in FIG. 3, wherein the voltages +V, Vref and −V are respectively potential differences from the standard voltage Vo on the earthed middle terminal 5d. In this case, the output voltage +V on the terminal 5a can contain ripple component. The relation between the output voltages +V and Vref is as follows:

$$(+V) > (Vref).$$

The output voltage of the electric power circuit 500 is also applied to the insufficient voltage operation locking circuit 50. When the voltage +V becomes larger than ON level shown in FIG. 3, the comparator 53 which shows hysteresis turns the switch 54 on. And when the voltage +V becomes smaller than OFF level, the comparator 53 turns the switch 54 off.

The difference between the ON level and the OFF level is selected to be larger than the above-mentioned ripple component contained in the voltage +V, and thereby the switch 54 many not repeat the switching on and off by the ripple component.

Namely, the insufficient voltage operation locking circuit 50 turns the switch 54 on only when all of the following conditions are satisfied simultaneously: the voltage +V is over a predetermined value; the voltage Vref is fully stable; and the voltage −V reaches to a predetermined value.

On the other hand, electric powers of the differential amplifiers 60 and 61 are supplied from the electric power circuit 500, and input voltages of the differential amplifiers 60 and 61 are supplied from the resistors 40 and 41. Gains of the differential amplifiers 60 and 61 are defined to be such that the gain of the differential amplifier 60 is smaller than that of the differential amplifier 61. Therefore, incline of the output voltage characteristic of the differential amplifier 60 shown by A in FIG. 4 can be made larger than that of the conventional one shown by C in the long time tripping region. As a result, weak change of current value in the long time tripping region can be detected precisely. Hereupon, as the output voltage of the other differential amplifier 61 has charge of the short time tripping region wherein change of current value is large, the incline of the output voltage characteristic shown by B is sufficient to be equal to the conventional one shown by C.

Figure 4:
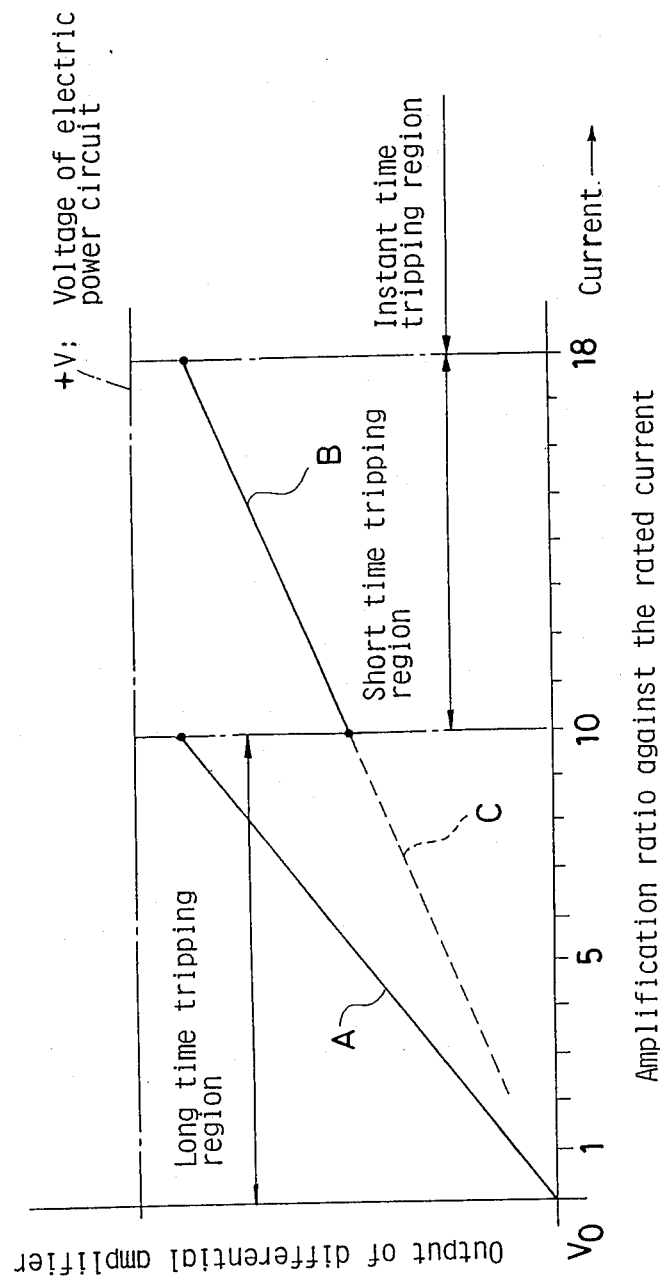
FIG. 4 is a drawing showing the relation between output voltage of a differential amplifier 63 shown in FIG. 1 and the voltage applied thereto.
Figure 5:
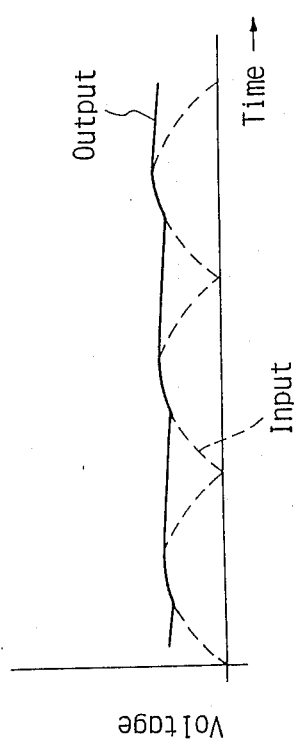
FIG. 5 is a drawing showing an input voltage and an output voltage of peak value converting circuits 210, 210 shown in FIG. 1.
Figure 6:
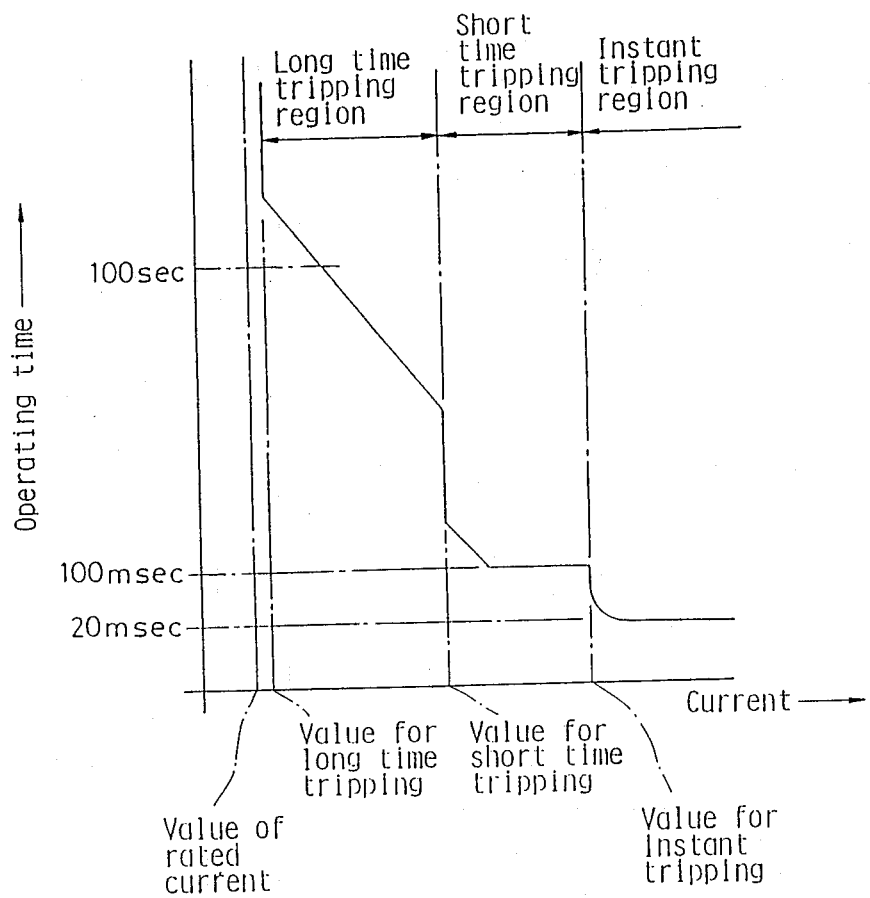
FIG. 6 is a drawing showing tripping characteristics of a known circuit breaker.

When an instant value of the output of the differential amplifier 60 is above the instant time tripping region shown in FIG. 4, the instant time tripping circuit 230 issues an output signal as an output of the time delay circuit 70. And the output of the differential amplifier 60 is applied to the peak value conversion circuits 210 and 210. Waveforms of the peak value conversion circuits 210 and 210 are, for example, shown in FIG. 5. Outputs of the peak value conversion circuits 210 and 210 are respectively applied to the short time tripping circuit 220, and the long time tripping circuit 170. When the values of the output current of the peak value conversion circuits 210 and 210 are above the short time tripping region and the long time tripping region shown in FIG. 4, the short time tripping circuit 220 and the long time tripping circuit 170 respectively issue output signal as an output of the time delay circuit 70.

The output signal of the time delay circuit 70 passes the output switch 54 of the insufficient voltage operation locking circuit 50 and triggers the switching circuit 120 to produce an input. Thereby, the switching circuit 120 is turned on and the electromagnetic tripping coil 80 is excited. When the electromagnetic tripping coil 80 is excited, the load break contact 201 which is linked to the electromagnetic tripping coil 80 by the tripping mechanism 100 shown in FIG. 1 is opened for breaking the accidental overcurrent. Such a tripping operation is for example, shown is FIG. 6.

By the way, when the value of the current flowing on the load break contact 201 is smaller as 10-20% of the value of the rated current thereof, the electric power circuit 500 may output insufficient voltage for driving the time delay circuit 70. Under such a condition that the insufficient voltage state is outputted, the output switch 54 of the insufficient voltage operation locking circuit 50 turns off to prevent the switching on of the switching circuit 120, even when the time delay circuit 70 outputs an erroneous output.

Next, testing operation of the above-mentioned circuit breaker in accordance with the present invention is described.

At first, the terminals 15a, 15b, 15c and 15d are respectively connected to the contacts 11a, 11b, 11c and 11d of the connector 11.

Under the condition that the load break contact 201 is opened and any current does not flow on the A.C. power line 1, when the switch 17a is closed, a predetermined voltage, for example, 24V is applied to the electric power circuit from the outer D.C. power source 16, and direct current (D.C) flows on the electric power circuit 500.

Under the above-mentioned condition, when the switch 17b is closed, the switch 18 is turned to be connected to the first D.C. power source 19 by the output of the first test signal generating circuit 13. The voltage from the first D.C. power source 19 is applied to the positive input terminal of the differential amplifier 60 as an input signal and the output signal of the differential amplifier 60 is applied to the time delay circuit 70. Hereupon, since the level of the output signal of the differential amplifier 60 is high, the instant time tripping circuit 230 issues an output in the instant time tripping region shown in FIGS. 4 and 6 as an output of the time delay circuit 70.

On the contrary, when the switch 17c is closed instead of the switch 17b, the switch 22 is turned to be connected to the second D.C. power source 20 by the output of the second test signal generating circuit 14. The voltage from the second D.C. power source 20 is applied to the positive input terminal of the differential amplifier 61 as an input signal. And the output signal of the differential amplifier 61 is applied to the time delay circuit 70. Hereupon, since the level of the output signal of the differential amplifier 61 is relatively lower than that of the differential amplifier 60, the long time tripping circuit 170 issues an output in the long time tripping region shown in FIGS. 4 and 6 as an output of the time delay circuit 70.

As it is obvious from the above-mentioned description, checking of the instant time tripping characteristic and the long time tripping characteristic in the state that the circuit breaker is actually connected in the power line for use can easily be executed by following steps of: connecting the terminals 15a, 15, 15c and 15d to the contacts 11a, 11b, 11c and 11d of the connector 11 respectively for testing operation and turning on the switch 17; supplying the voltage of the D.C. power source 16 to the electric power circuit 500; closing the switch 17b or 17c; turning the switch 18 or 22 to be connected to the D.C. power source 19 or 20 by the output of the first or second test signal generating circuit 13 or 14; and applying the output voltage of the first or second D.C. power source 19 or 20 quasi input signal to the differential amplifier 60 or 61.

Furthermore, in the above-mentioned embodiment, under condition that the load break contact 201 is closed and the A.C. power line 1 is active as current flows thereon, even when each of the contact 11a, 11b, 11c or 11d of the connector 11 is shortcircuited, unexpected accident which badly affects the instant time tripping characteristic or the long time tripping characteristic does not occur because the diode 12 for preventing the reverse current is connected between the contact 11b and the positive terminal of the rectifying circuit 30.

In the above-mentioned embodiment, only checking of the instant time tripping characteristic and the long time tripping characteristic is described. However, checking of the short time tripping characteristic is executed by the similar way.

Furthermore, the above-mentioned embodiment is described as a circuit breaker for breaking single phase of A.C. power line. However, a circuit breaker for breaking double or triple phases of A.C. power lines can be realized by comprising: plural current transformers for converting currents flowing on the double or triple phases to output currents of secondary winding in proportion to predetermined ratio of current transformation; plural rectifying circuits for converting the alternating secondary output current of the current transformers to unidirectional currents; series connection of plural (four or six) resistors which are also connected to an electric power circuit whereon the output current of the rectifying circuits flow; and plural sets of differential amplifier, test signal generating circuit, switch and so on corresponding to respective resistors. Thereby, the circuit breaker for plural phases of A.C. power lines has checking function of the tripping characteristic similar to the afore-mentioned embodiment.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A circuit breaker comprising:
    at least one current transformer for detecting current flowing on at least one A.C. power line;
    at least one rectifying circuit for converting A.C. output of secondary winding of said current transformer to unidirectional current;
    a series connection of an electric power circuit and at least one resistor connected between output terminals of the rectifying circuit, said resistor being for converting current flowing thereon to a voltage;
    at least one differential amplifier for amplifying said voltage across both ends of said resistor;
    at least one D.C. power source for outputting quasi input voltage;
    at least one switch connected between said D.C. power source and said differential amplifier;
    at least one test signal generating circuit for generating an output for controlling said switch on and off, to apply said quasi input voltage to said differential amplifier when the switch is turned on;
    at least one connector having plural contacts for supplying D.C. voltage from external power source to said electric power circuit and said test signal generating circuit; and
    a reverse current preventing device connected between the electric power circuit and said contacts of said connector.

* * * * *